United States Patent [19]

Wilson

[11] Patent Number: 4,679,491
[45] Date of Patent: Jul. 14, 1987

[54] REACTION MECHANISM FOR TANDEM BRAKE BOOSTER

[75] Inventor: Robert K. Wilson, Granger, Ind.

[73] Assignee: Allied Corporation, Morristown, N.J.

[21] Appl. No.: 795,304

[22] Filed: Nov. 4, 1985

[51] Int. Cl.⁴ .............................................. F15B 9/10
[52] U.S. Cl. ................................. 91/369 A; 91/369 B; 92/50; 92/75
[58] Field of Search .............................. 92/50, 69, 75; 91/369 B, 369 A, 369 R, 369 C

[56] References Cited

U.S. PATENT DOCUMENTS

| | | | |
|---|---|---|---|
| 4,069,742 | 1/1978 | Gephart et al. | 91/369 B X |
| 4,107,926 | 8/1978 | Adachi | 91/369 B X |
| 4,387,626 | 6/1983 | Myers | 92/50 X |
| 4,475,439 | 10/1984 | Myers | 92/50 X |

*Primary Examiner*—Robert E. Garrett
*Assistant Examiner*—Mark A. Williamson
*Attorney, Agent, or Firm*—Leo H. McCormick, Jr.; Ken C. Decker

[57] ABSTRACT

A reaction mechanism (462) that is carried on a disc (80) of a wall (70) to provide a control mechanism (81) with an indication of the output force being supplied to a push rod (132) through the combined outputs of wall (70) and wall (18) which move in opposite directions.

8 Claims, 8 Drawing Figures

REACTION MECHANISM FOR TANDEM BRAKE BOOSTER

This invention relates to a tandem brake booster having first lever means with cam surfaces thereon through which an output force from a secondary wall is transferred into an output member without the introduction of rotational forces to a primary wall and second lever means with cam surfaces thereon through which a reaction force corresponding to the output force is transmitted into a control member to balance an input force supplied thereto.

In evaluation of the tandem brake booster disclosed in U.S. Pat. No. 4,387,626 and in an effort to simplify the construction thereof, it was observed that under some conditions the actual output force was less than the theoretical output force. On investigation it was found that the lever arms through which the output force from the secondary piston is transferred to the output member was introducing a rotative torque into the output member.

In the tandem brake booster of the invention disclosed in copending U.S. patent application Ser. No. 665,847 first and second lever arms have cam surfaces thereon which engage cam surfaces on the output member through which the output from the secondary wall is transferred to the output member along a force vector that is substantially parallel to the output member and as a result the introduction of rotative forces into the output member are substantially eliminated. This invention operates satisfactorily, however, the reaction force associated with the output force is somewhat diminished by the factor of the second output force.

The invention herein discloses a reaction mechanism having a first plunger connected to the output member with a projection for transmitting a reaction force corresponding to the output force of the brake booster, a second plunger carried by the secondary wall and connected to the control member and reaction lever arms carried by the second wall and connected to the first and second plunger. While the first and second walls move in opposite directions, the first lever means combine their individual outputs to produce the output force, and the second lever means moves in such a manner that the reaction force is transferred from the first plunger into the second plunger without any substantial change therein.

An advantage resulting from this invention is that the smooth transition occurs during braking as the output force developed in a brake booster matches an operational level corresponding to a desired input force.

A further advantage of this invention occurs through the use of reaction lever arms with cam surfaces thereon which engage similar cam surfaces on an input member to transfer a reaction force from an output member into an input member along a substantially vertical vector plane to eliminate any reduction in the reaction forces therein that may effect the operation of the control member.

It is an object of this invention to provide a tandem brake booster with first lever arms having cam surfaces thereon through which an output force from a second wall is transferred to an output member and added to the output of a first wall without the introduction of forces that may cause a rotative torque in the output member and second lever arms having cam surfaces thereon through which a reaction force corresponding to the resistance to movement of an output member is carried into a control member to balance an input force applied thereto.

The invention will now be described with reference to the accompanying drawings wherein.

Figure 1:
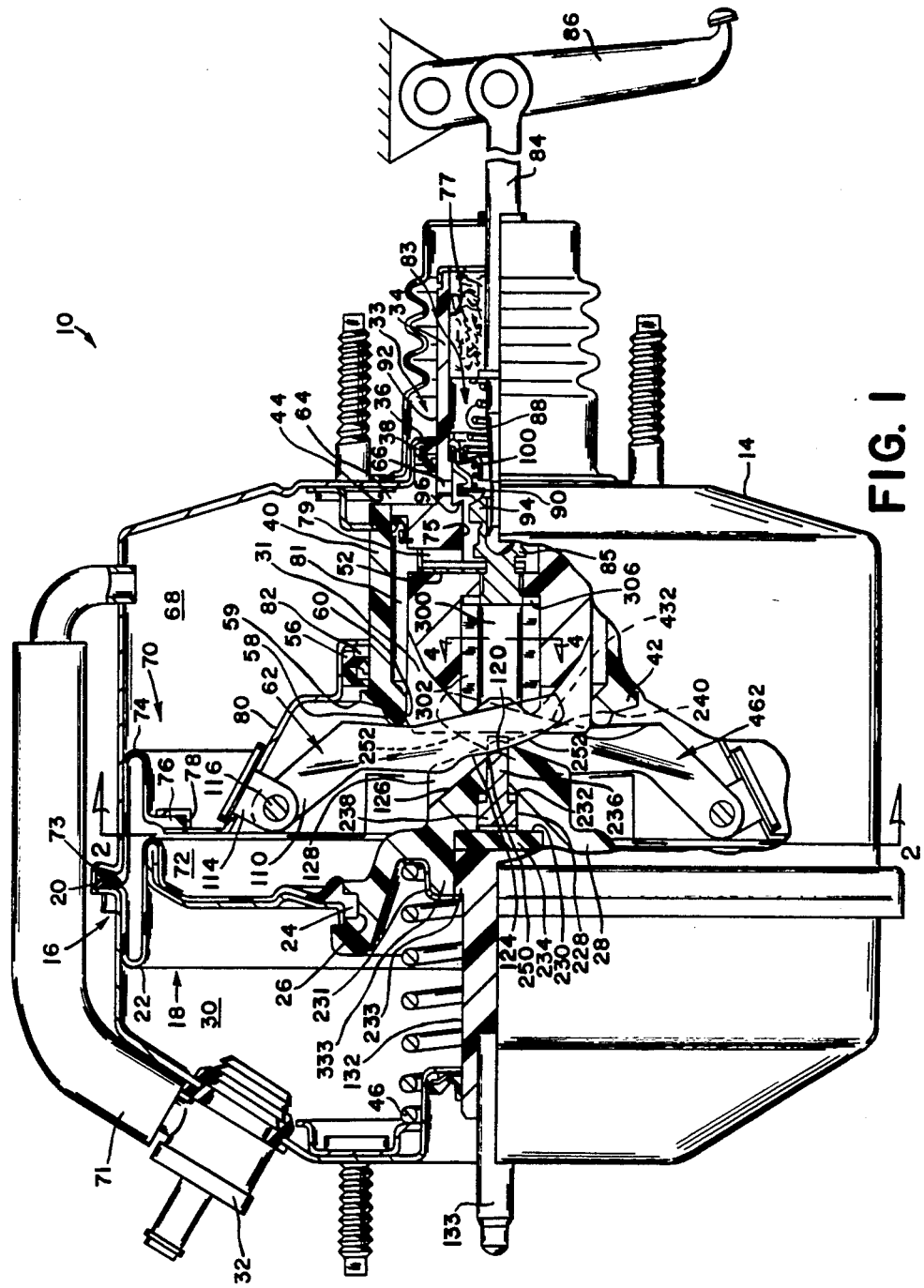
FIG. 1 is a sectional view of a tandem brake booster taken line 1—1 of FIG. 5 showing the lever means for transferring operational forces to an output member and a reaction force from the output member even though the first and second operational walls of the booster move in opposite directions.
Figure 5:
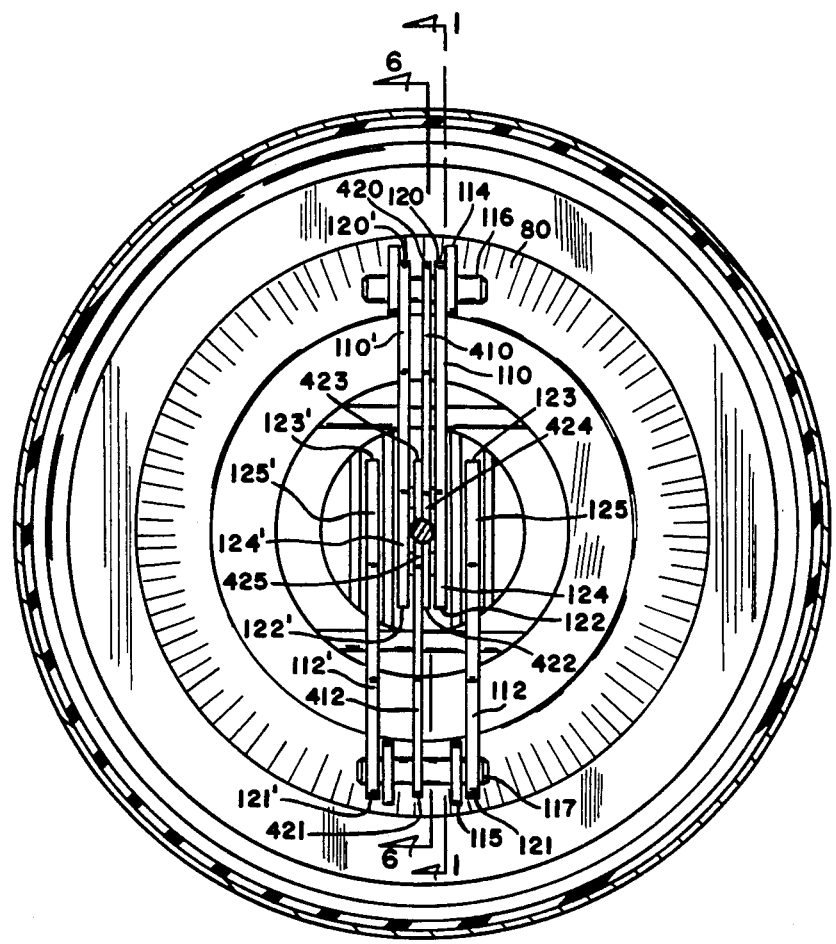
Figure 6:
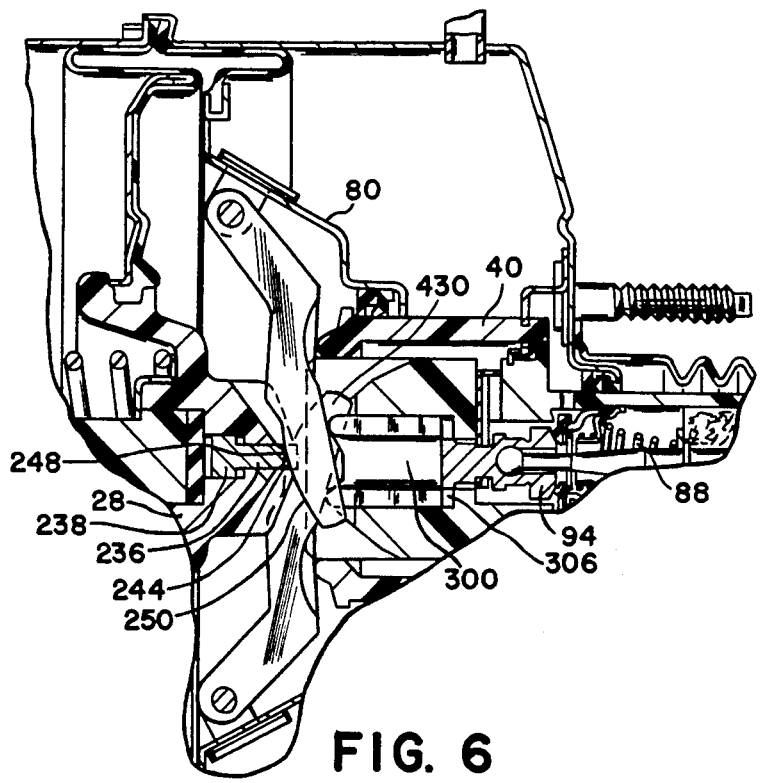
Figure 7:
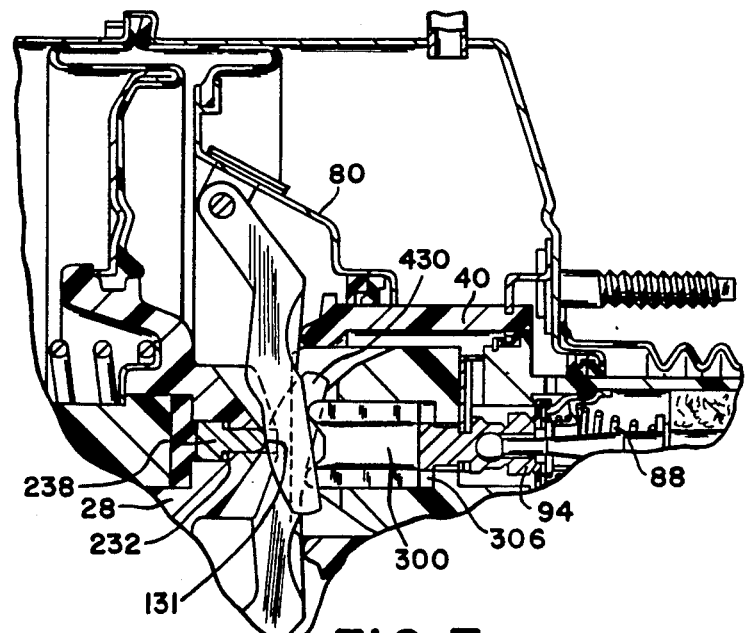
Figure 8:
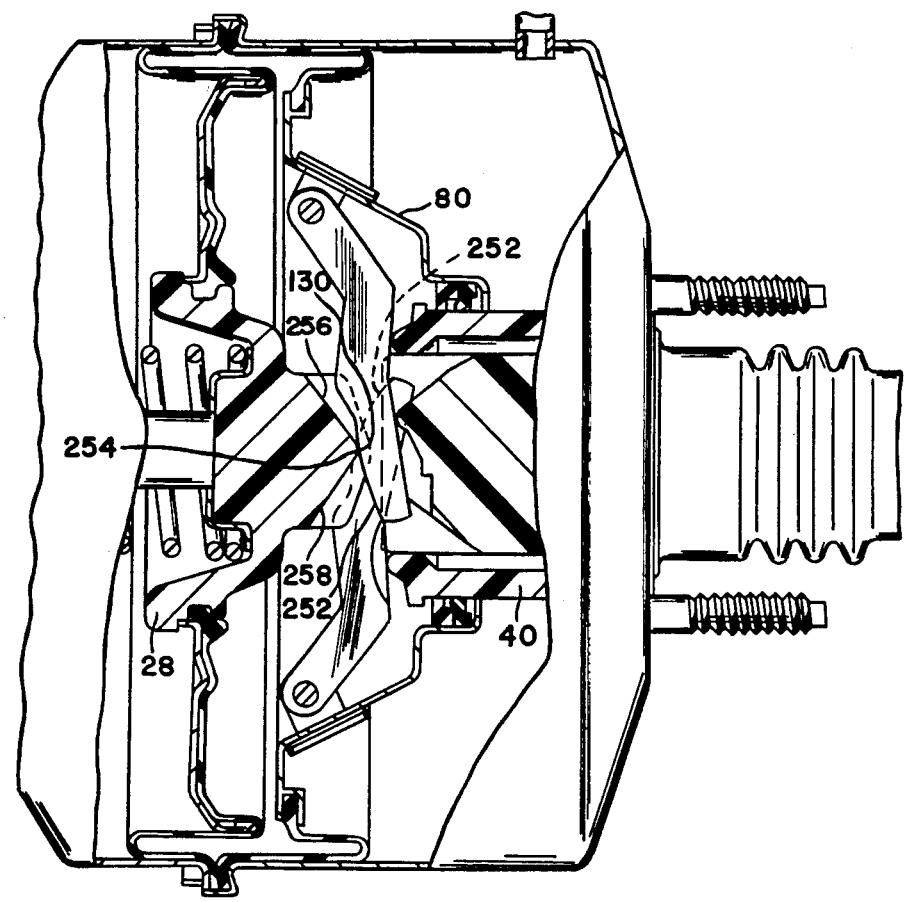

FIG. 5 sectional view taken along line 5—5 of FIG. 1 showing the lever arms attached to the second wall;

FIG. 6 is a sectional view taken along line 6—6 of FIG. 5 showing the reaction levers in a rest position;

FIG. 7 is a sectional view of the reaction levers shown in FIG. 5 with an input force applied to the control valve; and FIG. 8 is a sectional view of the output levers shown in FIG. 1 with an input force applied to the control valve.

The tandem brake booster 10 shown in FIG. 1 has a housing formed by joining as first shell 12 to a second shell 14 by a twist lock mechanism 16. A first wall 18 has a diaphragm 22 with a first bead 20 retained by the twist lock mechanism 16 and a second bead 24 located in a groove 26 in a first hub mechanism 28 carried by the first wall 18. The first shell 12 and first wall 18 define a first chamber 30. The first chamber 30 is connected to a source of vacuum through check valve 32.

Figure 2:
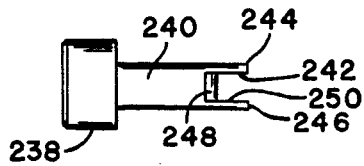
FIG. 2 is a perspective view of the reaction plunger shown in FIG. 1.

Hub 28 has an axial bore 228 located therein with a first shoulder 230 and a second shoulder 232. A rubber reaction disc 234 is located in bore 228 against the first shoulder 230 and head 233 on output push rod 132 positioned against reaction disc 234. Push rod 132 is held in bore 232 by clip 231 that surrounds lip 233. A first plunger 236 as best seen in FIG. 2 has a head 238 located in bore 228 between shoulder 232 and reaction disc 234 and a projection 240 that extends out of the hub 28. Projection 240 has a slot 242 on the end thereof that defines arms 244 and 246. At the bottom of slot 242 is an apex 248 for curved or cam surfaces 250 and 252. Apex 248 corresponds with a horizontal plane that extends through the axial center of the output push rod 132. Hub 28 as best seen in FIG. 8 has an apex 254 for cam surfaces 256 and 258 that extend in the same plane as cam surfaces 250 and 252 on apex 248.

A control member 33 has a housing 31 with a projection 34 that extends through an opening 36 in shell 14. A bearing-seal arrangement 38 located in opening 36 engages projection 34 to hold the control member 33 in axial alignment within housing 10.

A cylindrical member 40 which surrounds projection 34 has a first end 42 and a second end 44.

The first end 42 has an apex 56 that forms the fulcrum for a lever arrangement 62. Curved surfaces 58 and 60 which extend from apex 56 define the point of contact with the first lever arrangement 62 after movement from the apex 56. The cylindrical member 40 has a series of slots 64 (only one is shown) that connect opening 66 in projection 34 with chamber 68.

A second wall 70 has a first bead 73 of diaphragm 74 retained by the twist lock arrangement 16 and a second bead 76 located in a groove 78 in a disc member 80. The disc member 80 has a seal 82 located on the inner surface thereof which surrounds surface 84 on cylindrical body 40. Diaphragm 74, disc 80, cylindrical member 40 and shell 14 effectively define the limits of chamber 68. Walls 68 and 70 and cylindrical member 40 define a chamber 72 between chambers 30 and 68. Chamber 30 is connected to chamber 68 by a conduit 71, and chamber 68 in turn is connected to chamber 72 by passage or slots 64, opening 66, bore 75, passage or keyway 79, and passage 81 formed between cylindrical member 40 and projection 34.

A control valve 83 located in bore 77 has a plunger 85 connected to push rod 84. Push rod 84 is connected to brake pedal 86. A valve spring 88 located in bore 77 adjacent poppet member 92 acts on push rod 84 to bring atmospheric seat 94 on plunger 85 into contact with face 90 on poppet member 92. Retainer 52 located in passage 79 engages plunger 85 to limit the movement by spring 88. At the same time spring 100 acts on poppet 92 to assure that a seal is achieved between face 90 and atmospheric seat 94. A vacuum seat 96 formed in projection 34 allows free communication between passage 64, bore 75 and passage 79.

Figure 3:
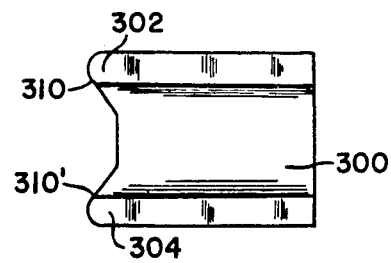
FIG. 3 is an end view of the reaction plunger taken along lines 3—3 of FIG. 1.
Figure 4:
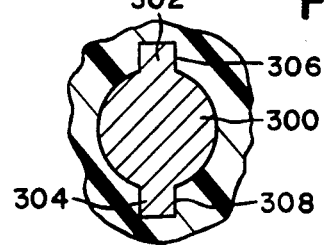
FIG. 4 is an end view of the reaction plunger of FIG. 3.

A plunger 300 best shown in FIGS. 3 and 4 located in bore 77 adjacent plunger 85 has a pair of arms 302 and 304 that extend into chamber 72. Arms 302 and 304 ride in grooves 306 and 308, respectively, to prevent the plunger 300 from rotating. Each of the arms 302 and 304 have a curved or cam surface 310, 310' located on the end thereof. The curved or cam surfaces 310, 310' forms a fulcrum for a second lever arrangement 462. By selectively positioning the radial distance which cam surface 310, 310' is located from the axial center of plunger 300, it is possible to modify the distance the output member 133 moves as compared to input member 84.

The first lever arrangement 62 located in chamber 72 as best shown in FIG. 5, has first arms 110, 110' and a second arm 112, 112'. Each of the arms 110 and 110' has a first end 120, 120' fixed to disc 80 by a pivot pin 116 located in a yoke 114 and a second end located on a curved surface 126 in a slot 128 on hub 28. The cam surface 124 has a contact point 120 on curved surface 126 in slot 128 that is on the vertical center of the output push rod 132.

Similarly each of the arms 112, 112' have a first end 121, 121' fixed to disc 80 by a pivot pin 117 located in a yoke 115 and a second end 123, 123'. The second end 123, 123' has a cam surface 125 that is located on a curved surface in slots not shown on hub 28.

Each of the first arms 110, 110' and second arms 112, 112' engage the fulcrum 56 but are designed to never come into contact with fulcrum or cam surfaces 310, 310' on plunger 300.

The second lever arrangement 462 as best shown in FIGS. 5, 6 and 7, has a first arm 410 and a second arm 412. Arm 410 has a first end 420 fixed to disc 80 by pivot pin 116 located on yoke 114 and a second end 422. Arm 412 has a first end 421 fixed to disc 80 by pivot pin 117 located on yoke 115 and a second end 423. The second ends 422 and 423 have cam surfaces 424 and 425, respectively, that engage apex 248 in slot 242 on plunger 238. Arms 244 and 246 on plunger 238 engage the arms 410 and 412 to hold surfaces 430 and 432 in alignment with cam surfaces 310, 310'. Arms 410 and 412 are designed to never come into contact with fulcrum 56 on cylindrical member 40.

The tandem brake booster 10 operates in the following manner.

When an internal combustion engine is operating, vacuum is produced at the intake manifold. This vacuum is communicated through check valve 32 to evacuated air directly from chamber 30 and by conduit 71 from chamber 68.

With the control valve 83 in the inoperative or rest position shown in FIGS. 1 and 6, return spring 88 holds plunger 85 against stop or retainer 52 to move face 90 on poppet 92 away from vacuum seat 96 to allow any air present in chamber 72 to be evacuated by way of passage 81, passage or keyway 79, bore 75, passage or bore 66, and slots 64 connected to chamber 68 which is in continual fluid connection with check valve 32 and the vacuum source. With vacuum in chambers 30, 68 and 72, return spring 46 acts on and moves hub 28 toward cylindrical member 40. The arms 110, 110' and 112, 112' of the first lever arrangement 62, engage fulcrum 56 to move the second wall 70 toward the first wall 18. When seal 82 carried by flange 84 on disc 80 engages stop 59 the first and second walls 18 and 70 are in the rest position shown in FIGS. 1 and 6 in the drawing.

In response to an input force applied to pedal 86 push rod 84 moves plunger 82 and permits spring 88 to position face 90 on poppet member 92 on vacuum seat 96. Further movement of plunger 82 moves atmospheric seat 94 away from face 90 to allow air present in bore 74 to enter chamber 72 by way of bore 75, opening 79 and passage 81. With air in chamber 72, a pressure differential is created across the first and second wall 18 and 70.

The pressure differential across the first wall 18 creates a force that is directly transferred into the output push rod 132 by way of reaction disc 234 for operating the master cylinder push rod 133. At the same time as shown in FIG. 8, the pressure differential acting on the second wall 70 is transferred by way of the lever arrangement 62 into hub 28 where it is combined with the force from the first wall 18 to produce an output force for operating the master cylinder 200 corresponding to the input force applied to brake pedal 86.

As best seen in FIGS. 7 and 8 which illustrates an operational position of the first and second walls 18 and 70 corresponding to an input force, the contact points 131 for the cam surface 124, 124' and 125, 125', on levers 110, 110', and 112, 112', remain in a vertical plane that passes through the axial center of the output push rod 132. The relationship between the engagement of cam surfaces 124, 124' and 125, 125', on lever arms 110, 110' and 112, 112' with the curved surface 126 in the bottom of slots 128, 128' hold the contact points 130 in substantially the vertical plane throughout the entire stroke of the walls 18 and 70 to assure that rotational forces are not introduced into hub 28.

As the output force is produced, the resistance to movement of the pistons in master cylinder 200 produces a reaction force that is carried through head 233 on push rod 132 into disc 234. The reaction force causes disc 234 to deform and transmit the reaction force into head 238 on plunger 236. The reaction force causes plunger 236 to move toward shoulder 29. Movement of plunger 236 is carried through apex 248 into the cam surfaces 424 and 425 on reaction lever arms 410 and 412. Since ends 420 and 421 are fixed, the reaction force is carried into cam surfaces 310, 310' on plunger 300 for providing plunger 85 with a balancing force which equals the input force applied to the brake pedal 86.

As best seen in FIGS. 7 and 8, the first lever arrangement 62 moves in a first direction to supply the first wall 18 with the output force produced on movement of wall 70 and the second lever arrangement 462 moves independently in response to a reaction force produced in the output push rod 132 to provide the operator with a true indication of the output force being produced to effect a brake application.

On termination of the input force, spring 88 moves vacuum seat 94 on plunger 85 against face 90 to interrupt the communication of air into chamber 72. Further movement of the plunger 85 by spring 88 moves face 90 away from atmospheric seat 96 to allow vacuum present in chamber 68 to evacuate air from chamber 72. As air is evacuated from chamber 72, the pressure differential across walls 18 and 70 is reduced and return spring 46 moves the walls 18 and 70 to the rest position shown in FIG. 1.

I claim:

1. A reaction mechanism for a tandem brake booster having first and second walls that move in opposite directions within a cavity to produce first and second output forces in response to an input force applied to a control member and a force transmitting lever arrangement through which said second output force is presented to an output member and combined therein with said first output force to create a joint output force, said force transmitting lever arrangement having first and second arm means each of which has a first and connected to said second wall, a fulcrum, and a second end connected to said output member, each of said arm means having a first cam surface that engages said fulcrum and a second cam surface that engages said output member, said first and second cam surfaces directing said second output force along a force vector substantially parallel to said output member to prevent the introduction of forces that may rotate said first wall, the improvement comprising:

a first plunger carried by said first wall and having a projection that extends therethrough, said projection having a slot extending from the end thereof for a set distance;

a second plunger carried by said control member; and reaction lever means having third and fourth arm means each of which has a first end connected to said second wall and a second end located in said slot in said projection on said first plunger, said first plunger responding to said joint output force by moving to provide said second end of said third and fourth arm means with a reaction force, said reaction force being transmitted into said second plunger to balance said input force; said slot providing a guide for the second ends of the third and fourth arm means to assure that the reaction force is transmitted to the second plunger without the introduction of moments.

2. The reaction mechanism, as recited in claim 1 wherein said projection further includes:
an apex at the bottom of said slot, said reaction force being transferred through said apex into said second ends on said third and fourth arm means.

3. The reaction mechanism, as recited in claim 2 wherein said third and fourth arm means includes:
third and fourth cam surfaces adjacent said second ends, said cam surfaces engaging said apex to transfer the reaction forces into said second plunger, said third and fourth cam surfaces allowing said reaction forces to be transmitted into said second plunger even though said first ends of said third and fourth arm means move with said second wall.

4. The reaction mechanism, as recited in claim 3 wherein said second plunger includes:
fifth and sixth cam surfaces that engage said third and fourth arm means, respectively, to compensate for differences in movement between said first wall, second wall and first plunger to assure that said reaction force is transmitted into said second plunger without being modified.

5. The reaction mechanism, as recited in claim 4 further including:
a third plunger carried by said second wall and connected to said control member, said third plunger engaging said second plunger and transmitting said reaction force into an input member.

6. The reaction mechanism, as recited in claim 5 further including:
a retainer member connected to said control member for holding said third plunger in the control member, said retainer allowing said third plunger to move in response to both the input force and reaction force 7. The reaction mechanism, as recited in claim 6 wherein said control member includes:
a passage that connects a bore in the control member with an operational chamber in said cavity, said retainer member being located in said cavity and yet substantially unrestricted communication is permitted between the bore and operational chamber.

8. The reaction mechanism, as recited in claim 1 wherein said second plunger includes:
a fulcrum means that engage said reaction lever to modify the relative movement of an input member through which the input force is applied to said control member as compared to movement of said output member.

* * * * *